(12) United States Patent
Nagasaka et al.

(10) Patent No.: US 12,387,244 B2
(45) Date of Patent: Aug. 12, 2025

(54) INFORMATION PROCESSING APPARATUS, INFORMATION PROCESSING METHOD, AND NON-TRANSITORY STORAGE MEDIUM FOR PERFORMING VALUATION OF VEHICLE

(71) Applicant: TOYOTA JIDOSHA KABUSHIKI KAISHA, Toyota (JP)

(72) Inventors: Osamu Nagasaka, Toyota (JP); Norihiko Oshio, Nagoya (JP); Kosuke Sakakibara, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 448 days.

(21) Appl. No.: 17/934,824

(22) Filed: Sep. 23, 2022

(65) Prior Publication Data
US 2023/0121004 A1 Apr. 20, 2023

(30) Foreign Application Priority Data
Oct. 15, 2021 (JP) ................. 2021-169873

(51) Int. Cl.
*G06Q 30/02* (2023.01)
*G06V 10/94* (2022.01)
*H04N 1/00* (2006.01)

(52) U.S. Cl.
CPC ......... *G06Q 30/0278* (2013.01); *G06V 10/95* (2022.01); *H04N 1/00286* (2013.01)

(58) Field of Classification Search
None
See application file for complete search history.

(56) References Cited

U.S. PATENT DOCUMENTS

2022/0138675 A1* 5/2022 Heninger ............... G06Q 10/20
705/1.1

FOREIGN PATENT DOCUMENTS

JP 2017122961 A * 7/2017
JP 2018-97679 A 6/2018

OTHER PUBLICATIONS

Translation for JP 2017122961-A (Year: 2017).*

* cited by examiner

*Primary Examiner* — Lennin R Rodriguezgonzalez
(74) *Attorney, Agent, or Firm* — Oblon, McClelland, Maier & Neustadt, L.L.P.

(57) ABSTRACT

An information processing apparatus determines whether a sticker displaying that an upgraded vehicle part is mounted is attached to a first vehicle or not, and performs a process related to valuation of the first vehicle with the upgraded vehicle part taken into account, in a case where the sticker is attached to the first vehicle.

15 Claims, 15 Drawing Sheets

FIG. 2

```
┌─────────────────────────────────────────┐
│    ┌───────────────────────────────┐    │
│    │          UPGRADED             │    │
│    │    COMPONENT UPGRADED         │    │
│    └───────────────────────────────┘    │
│                                         │
│    PLEASE REFER TO MAINTENANCE NOTE     │
│    FOR DETAILED INFORMATION             │
└─────────────────────────────────────────┘
```

FIG. 6

VEHICLE DATA

| | | |
|---|---|---|
| BASIC INFORMATION | MANUFACTURER | ... |
| | VEHICLE NAME | ... |
| | GRADE | ... |
| | MODEL YEAR | ... |
| | CHASSIS NUMBER | ... |
| | VEHICLE INSPECTION | ... |
| | VEHICLE BODY COLOR | ... |
| | MILEAGE | ... |
| | INTERIOR EVALUATION DATA | ... |
| | EXTERIOR EVALUATION DATA | ... |
| FIRST IMAGE | | ... |
| UPGRADE INFORMATION | SEAT | REPLACED WITH GENUINE LEATHER SEAT |
| | ECU | REPLACED WITH SPORT ECU |
| | ... | ... |
| ... | ... | ... |

FIG. 8

MAINTENANCE HISTORY DATA

| CHASSIS NUMBER | DATE/TIME | MAINTENANCE TYPE | TARGET | DETAILS |
|---|---|---|---|---|
| V001-000001 | ... | UPGRADE | MAIN ECU | STANDARD PRODUCT REPLACED WITH HIGH-FUNCTION PRODUCT |
| V001-000001 | ... | UPGRADE | MAIN ECU | UPDATED BY ADDING XXX FUNCTION |
| V001-000001 | ... | UPGRADE | SEAT | SEAT REPLACED WITH GENUINE LEATHER SEAT |
| V001-000001 | ... | REPAIR | RIGHT DOOR PANEL | SCRATCHES REPAIRED |
| V001-000001 | ... | REPLACEMENT OF CONSUMABLES | ENGINE OIL | REPLACED (0W-20, OIL FILTER) |
| ... | ... | ... | ... | ... |

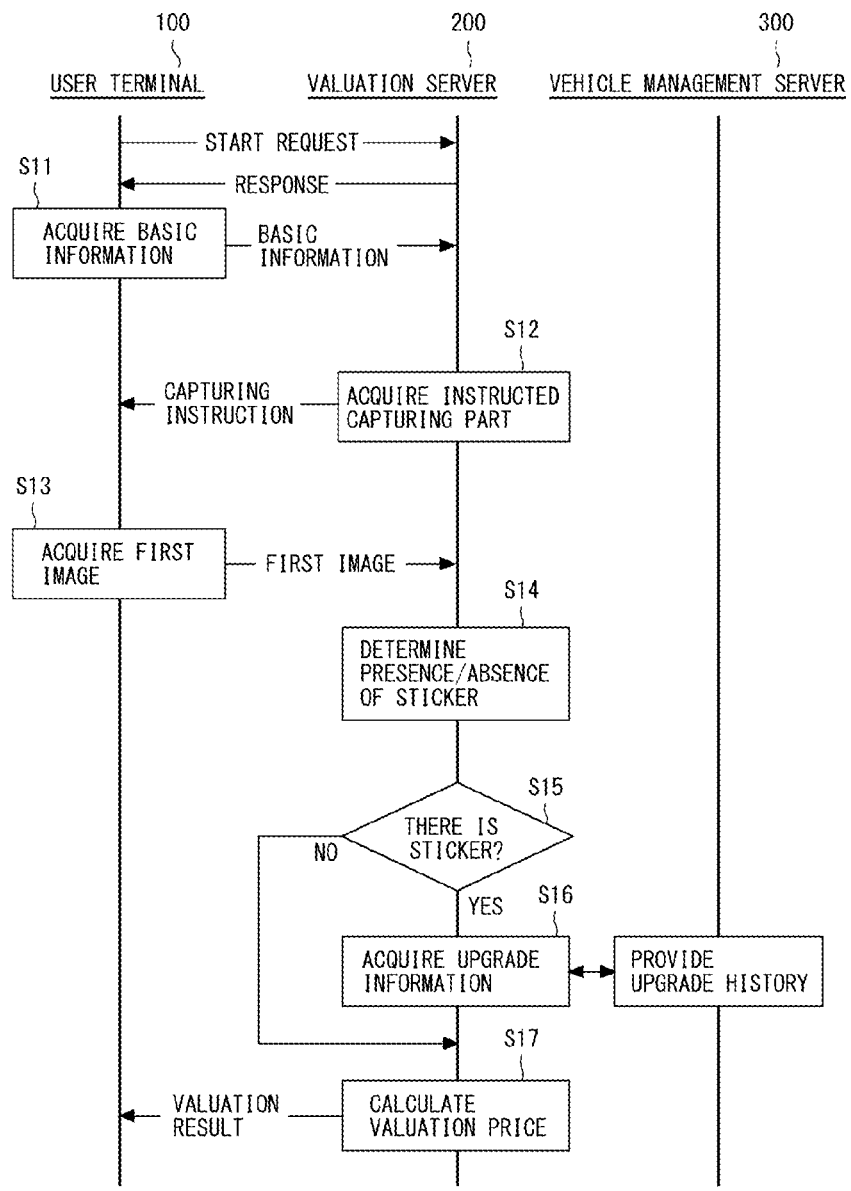

*FIG. 10A*

| DETAILED VEHICLE INFORMATION | |
|---|---|
| VEHICLE NAME | NOT INPUT ▼ |
| GRADE | NOT INPUT ▼ |
| MODEL YEAR | NOT INPUT ▼ |
| VEHICLE BODY COLOR | NOT INPUT ▼ |
| CHASSIS NUMBER | NOT INPUT ▼ |

( NEXT )

*FIG. 10B*

| DETAILED VEHICLE INFORMATION | |
|---|---|
| INTERIOR | NOT INPUT ▼ |
| EXTERIOR | NOT INPUT ▼ |

SCORING STANDARD

S: ALMOST SCRATCHLESS, NOT REPAIRED

6: ALMOST SCRATCHLESS, NOT REPAIRED AND NO MODIFICATIONS NEEDED

5: MINOR SCRATCHES, ALMOST NO NEED OF MODIFICATIONS

4: MINOR REPAIRS NEEDED

3: NOTICEABLE SCRATCHES, DENTS, RUST, TEAR, ETC.

2: BODYWORK AND MAJOR MODIFICATIONS NEEDED

1: FULL REPAIR AND REPLACEMENT NEEDED ( NEXT )

FIG. 12

PLEASE ATTACH UPGRADE
CERTIFICATE ON THIS PAGE

| 2019. 10. 1 | UPGRADED<br>PEDESTRIAN DETECTION FUNCTION |
| --- | --- |
| 2020. 2. 20 | UPGRADED<br>100 VAC, 1500 W OUTPUT |
| DATE | ATTACH CERTIFICATE |

INFORMATION PROCESSING APPARATUS, INFORMATION PROCESSING METHOD, AND NON-TRANSITORY STORAGE MEDIUM FOR PERFORMING VALUATION OF VEHICLE

CROSS REFERENCE TO THE RELATED APPLICATION

This application claims the benefit of Japanese Patent Application No. 2021-169873, filed on Oct. 15, 2021, which is hereby incorporated by reference herein in its entirety.

BACKGROUND

Technical Field

The present disclosure relates to valuation of used vehicles.

Description of the Related Art

There is a technique for performing online valuation of a used vehicle. In this regard, Patent Literature 1 discloses a system that achieves highly accurate valuation by having an image of a vehicle and engine sound of the vehicle uploaded.
[Patent Literature 1] Japanese Patent Laid-Open No 2018-097679

SUMMARY

The present disclosure is aimed at performing valuation of a vehicle by a simple method.

An information processing apparatus according to a first aspect of the present disclosure includes a controller configured to:
  determine whether a sticker displaying that an upgraded vehicle part is mounted is attached to a first vehicle or not, and
  perform a process related to valuation of the first vehicle with the upgraded vehicle part taken into account, in a case where the sticker is attached to the first vehicle.

An information processing method according to a second aspect of the present disclosure includes:
  determining whether a sticker displaying that an upgraded vehicle part is mounted is attached to a first vehicle or not, and
  performing a process related to valuation of the first vehicle with the upgraded vehicle part taken into account, in a case where the sticker is attached to the first vehicle.

An information processing apparatus according to a third aspect of the present disclosure is an information processing apparatus for acquiring an image related to a first vehicle, the information processing apparatus including a controller configured to:
  acquire a first image including at least a part of the first vehicle, and
  acquire a second image for identifying an upgraded vehicle part in a case where a sticker displaying that the upgraded vehicle part is mounted is detected from the first image.

Furthermore, another aspect of the present disclosure is a program for causing a computer to perform the information processing method described above, or a non-transitory computer-readable storage medium storing the program.

According to the present disclosure, valuation of a vehicle may be performed by a simple method.

BRIEF DESCRIPTION OF THE DRAWINGS

FIG. 2 is a diagram illustrating an example of a sticker to be attached to a vehicle body;
FIG. 6 is an example of vehicle data stored in the valuation server;
FIG. 8 is an example of maintenance history data stored in the vehicle management server;
FIG. 9 is a sequence diagram illustrating processes that are performed by the structural elements of the system;
FIG. 10A is an example of a screen for inputting information about a target vehicle;
FIG. 10B is an example of a screen for inputting information about a target vehicle;
FIG. 12 is an example of an upgrade certificate.

DESCRIPTION OF THE EMBODIMENTS

Figure 1:
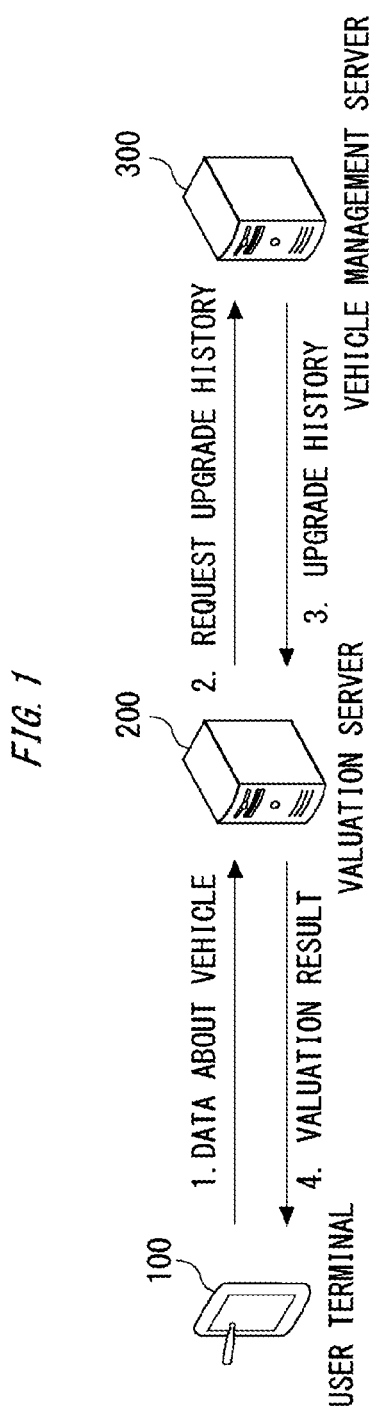
FIG. 1 is a diagram describing an outline of a valuation system.

There are techniques for enhancing quality, functions and the like of a vehicle in an ex-post manner. For example, fabric seats may be replaced with leather ones, or a steering wheel may be replaced with one with a built-in heater. Furthermore, by updating software of an in-vehicle computer, functions not installed at a time of sale of a new vehicle (such as functions related to safety and traveling support functions) may be added.

In the present disclosure, enhancing the function or quality of a vehicle through addition of a vehicle part, replacement of a vehicle part, update of software or the like will be referred to as "upgrading (of vehicle)".

In the case where upgrading of a vehicle is performed, value of a used vehicle is increased. Accordingly, at the time of valuation of a used vehicle, valuation is desirably performed also by taking into account "whether the vehicle is upgraded or not". However, in the case of performing valuation online, it is difficult to make a user of a vehicle provide accurate information about type and state of a vehicle part. That is, there is a problem that it is difficult to perform accurate valuation based only on declaration from the user.

An information processing apparatus according to the present disclosure solves such a problem.

An information processing apparatus according to a first mode of the present disclosure includes a controller configured to determine whether a sticker displaying that an upgraded vehicle part is mounted is attached to a first vehicle or not, and perform a process related to valuation of the first vehicle with the upgraded vehicle part taken into account, in a case where the sticker is attached to the first vehicle.

As a process related to valuation, a process of performing valuation of a first vehicle, a process of calculating a valuation price of the first vehicle, and a process of collecting information for performing valuation of the first vehicle may be cited as examples.

The sticker according to the present disclosure is a label displaying that an upgraded vehicle part is mounted on a target vehicle. The sticker may indicate that any vehicle part is replaced with one with a higher quality or a higher function, or may indicate that a predetermined vehicle part (for enhancing the function of the vehicle) is added in an ex-post manner. A vehicle part that is added in an ex-post manner also corresponds to "upgraded vehicle part".

For example, the sticker is attached to any position on a vehicle body (typically, a center pillar). Only one sticker is attached to one vehicle, for example. That is, a vehicle to which the sticker is attached is a vehicle that is upgraded in some way in an ex-post manner. Additionally, the sticker may be a laminated piece of paper, a metal plate or the like.

The information processing apparatus determines whether the sticker is attached to the first vehicle or not. For example, the determination may be performed based on contents input by a user, or based on an image obtained by capturing an image of the first vehicle (for example, a part of a vehicle body).

In the case where the sticker is attached to the first vehicle, the controller performs a process related to valuation of the first vehicle on a premise that an upgraded vehicle part is mounted.

For example, the controller may perform "a process of identifying a vehicle part related to upgrading", "a process of evaluating an identified vehicle part", and the like. A vehicle may thus be more accurately evaluated.

Additionally, in the case where the upgraded vehicle part may be identified from an appearance of the sticker, the upgraded vehicle part may be identified based on an image obtained by capturing an image of the sticker.

Furthermore, in the case where the upgraded vehicle part cannot be identified from the appearance of the sticker, a process for identifying the upgraded vehicle part may be further performed. For example, the controller may issue an inquiry to a database storing a maintenance history of the vehicle, or may acquire detailed information about the upgraded vehicle part via a user by making the user refer to a maintenance record of the vehicle.

Furthermore, an information processing apparatus according to another mode of the present disclosure is an information processing apparatus for acquiring an image related to a first vehicle, the information processing apparatus including a controller configured to acquire a first image including at least a part of the first vehicle, and acquire a second image for identifying an upgraded vehicle part in a case where a sticker displaying that the upgraded vehicle part is mounted is detected from the first image.

The first image is an image that includes the sticker described above. The second image is an image that includes information for identifying the upgraded vehicle part, and is typically an image that includes an upgrade certificate, for example. Information for evaluating the first vehicle may thus be collected.

Hereinafter, specific embodiments of the present disclosure will be described with reference to the drawings.

Hardware configurations, module configurations, functional configurations and the like described in each embodiment are not intended to limit the technical scope of the disclosure thereto unless stated otherwise.

First Embodiment

An outline of a valuation system according to a first embodiment will be described with reference to FIG. 1.

The valuation system according to the present embodiment includes a user terminal 100 that is associated with a user of a vehicle, a valuation server 200 that performs valuation of a vehicle, and a vehicle management server 300 that manages a maintenance record of a vehicle.

The user terminal 100 is an information processing apparatus that is used by a user who is associated with a vehicle. A user who is associated with a vehicle is an owner of the vehicle, for example. The user terminal 100 may be a terminal owned by an end user (such as the owner of the vehicle), or may be a terminal that is installed at a sales office of a vehicle manufacturer, a sales office of a vehicle buyer, or the like.

The valuation server 200 is an apparatus that performs online valuation of a given vehicle (that is, calculation of a valuation price as a used vehicle, calculation of a buying price, and the like), based on information acquired from the user terminal 100. The valuation server 200 collects general information about a vehicle, such as a model, a model year and a mileage of the vehicle, an upgrade history of vehicle parts, and the like, and performs valuation based on these information pieces.

The vehicle management server 300 is a server apparatus storing, in a database, a history of maintenance work and the like performed on a vehicle (hereinafter "history information"). The history information includes a history of repairs, a history of upgrading of vehicle parts, a history of replacement of consumables, and the like, for example. Of these, the history of upgrading of vehicle parts will be referred to as upgrade history.

The vehicle management server 300 provides, in relation to a vehicle that is a valuation target, the upgrade history of vehicle parts, based on a request received from the valuation server 200.

A description will be given of information that is collected by the valuation server 200.

The valuation server 200 collects, via the user terminal 100, general information about a target vehicle such as the model, the model year, a chassis number, and the mileage of the vehicle. These information pieces are written on a vehicle inspection certificate and the like, and may be acquired relatively easily.

In contrast, information pieces such as "whether an upgraded vehicle part is mounted" and "which of a plurality of vehicle parts is upgraded to which grade" are often not accurately grasped by the user.

Accordingly, in the present embodiment, the valuation server 200 first determines presence/absence of upgrading by interacting with the user, and then collects detailed information about the upgrading by communicating with the vehicle management server 300.

In the present embodiment, the valuation server 200 determines whether upgrading is performed on a predetermined vehicle or not, by making the user check the sticker that is attached to the vehicle.

The sticker in the present disclosure will be described. The sticker in the present disclosure is a label that is attached to a vehicle to certify that the vehicle is equipped with an upgraded vehicle part.

An upgraded vehicle part may be a vehicle part with a higher function or a higher quality after replacement, or a vehicle part that is added in an ex-post manner to enhance function of the vehicle.

Examples of target vehicle parts include an electronic control unit (ECU), an in-vehicle computer, a communication device, an infotainment terminal, an air conditioner, a seat, a steering wheel, a door, a sun roof, a mirror, and other electric components. Additionally, in the description of the embodiment, the target of upgrading is a vehicle part, but the target of upgrading may instead be a component formed from a plurality of vehicle parts. In this case, a component may be upgraded by replacing the plurality of vehicle parts forming the component.

FIG. 2 is a diagram illustrating an example of the sticker. Text displaying that the vehicle includes an upgraded vehicle part, text displaying that there is a vehicle part that is replaced with an upgraded product, or the like is described on the sticker. Text to be described on the sticker is not limited to specific text as long as it can be determined that the vehicle is upgraded in some way.

Figure 3:
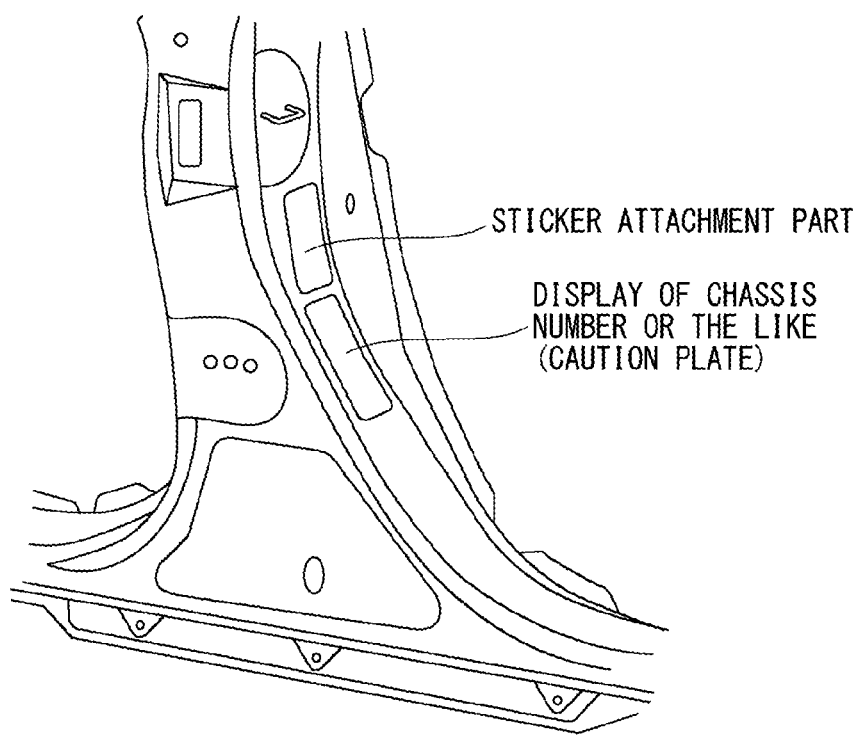
FIG. 3 is a diagram describing a location where the sticker is to be attached.

The sticker is attached to a predetermined part of the vehicle. FIG. 3 is a diagram describing a location where the sticker is to be attached. FIG. 3 is a diagram illustrating a vehicle body frame of the vehicle as seen from a front right side. A lower side in the drawing is a side sill, and a center is a center pillar (also referred to as a B pillar).

In the present example, the sticker is attached in a predetermined region on the center pillar. The attachment part may be near a caution plate indicating a chassis number or the like. By disposing the sticker at such a part, presence/absence of an upgrade may be easily checked by opening a door.

The valuation server 200 determines whether the sticker is attached or not, based on an image of the target vehicle captured by the user. Furthermore, in the case where the sticker is attached to the target vehicle, the valuation server 200 issues an inquiry to the vehicle management server 300, and acquires the upgrade history corresponding to the target vehicle. Accurate valuation of the target vehicle may thus be performed.

The user terminal 100 will be described in detail.

The user terminal 100 is a computer that is used by a user who is associated with a vehicle. A user may request online valuation of a given vehicle by accessing the valuation server 200 via the user terminal 100. For example, the user terminal 100 is a personal computer, a smartphone, a mobile phone, a tablet computer, or a personal digital assistant.

Figure 4:
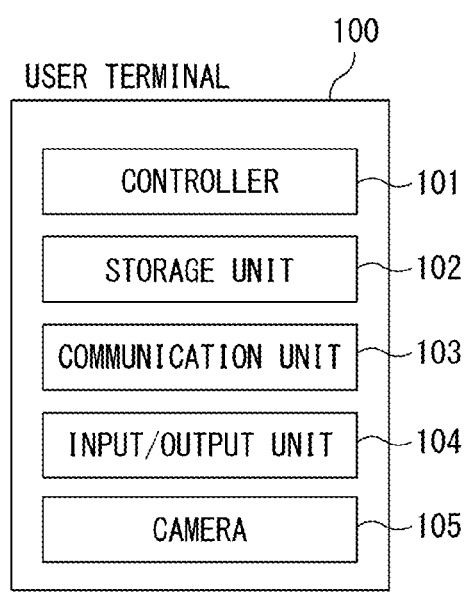
FIG. 4 is a diagram illustrating structural elements of a user terminal 100.

FIG. 4 is a diagram illustrating a system configuration of the user terminal 100.

The user terminal 100 includes a controller 101, a storage unit 102, a communication unit 103, an input/output unit 104, and a camera 105.

The controller 101 is an arithmetic device in charge of control that is performed by the user terminal 100. The controller 101 may be implemented by an arithmetic processing device such as a central processing unit (CPU).

The controller 101 executes a function of accessing the valuation server 200, and interacting with the valuation server 200. This function may be implemented by a web browser running on the user terminal 100, or by dedicated application software.

In the present embodiment, the controller 101 is capable of executing application software for interacting with the valuation server 200.

The storage unit 102 includes a main memory and an auxiliary memory. The main memory is a memory where programs to be executed by the controller 101, and data to be used by the programs are developed. The auxiliary memory is a device where the programs to be executed by the controller 101, and the data to be used by the programs are stored. Programs to be executed by the controller 101 may be packaged as applications and be stored in the auxiliary memory. Furthermore, an operating system for executing the applications may also be stored. Processes described below are performed by the programs stored in the auxiliary memory being loaded into the main memory and executed by the controller 101.

The main memory may include a random access memory (RAM) or a read only memory (ROM). Furthermore, the auxiliary memory may include an erasable programmable ROM (EPROM) or a hard disk drive (HDD). The auxiliary memory may further include a removable medium, or in other words, a removable recording medium.

The communication unit 103 is a wireless communication interface for connecting the user terminal 100 to a network. The communication unit 103 is capable of communicating with the valuation server 200 via a wireless LAN or a mobile communication service such as 3G, LTE or 5G, for example.

The input/output unit 104 is a unit that receives an input operation performed by a user, and that presents information to the user. In the present embodiment, the input/output unit 104 includes one touch panel display, or in other words, a liquid crystal display and control means therefor, or a touch panel and control means therefor.

The camera 105 is an optical unit including an image sensor for acquiring an image.

Next, a description will be given of the valuation server 200.

Figure 5:
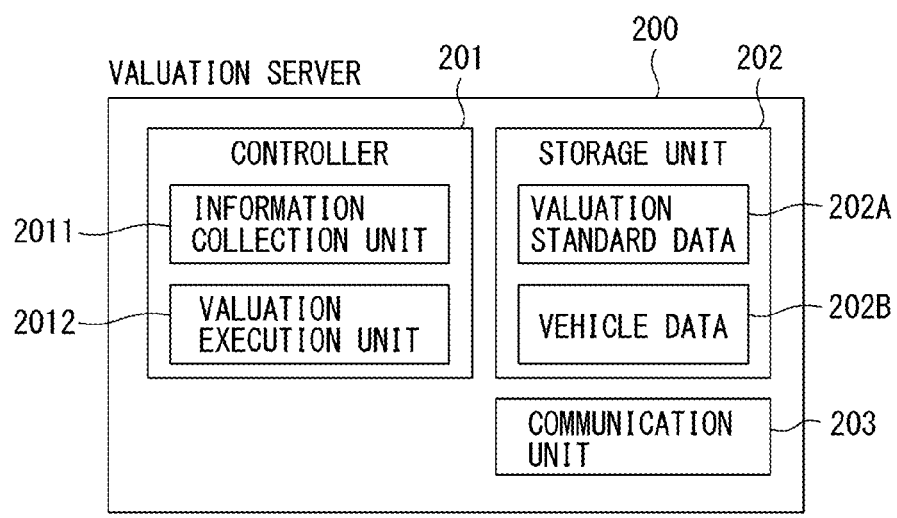
FIG. 5 is a diagram illustrating structural elements of a valuation server 200.

FIG. 5 is a diagram illustrating in detail structural elements of the valuation server 200 included in the valuation system according to the present embodiment.

The valuation server 200 is a server apparatus that performs online valuation of a vehicle based on information collected from the user terminal 100. The valuation server 200 holds data as evaluation standard for performing valuation (valuation standard data), and performs valuation of a target vehicle by checking information collected from the user terminal 100 against the valuation standard data. As specific examples of "valuation", there may be cited a process of calculating an expected price in a used vehicle market (such as an expected highest bid in an auction), a process of calculating a buying price based on the expected price, and the like. Such prices will be referred to as a valuation price.

Furthermore, the valuation server 200 performs a process of identifying the upgraded vehicle part, as described above, and uses the result in combination to calculate the valuation price of the vehicle. Specific processes will be described later.

The valuation server 200 may include a general-purpose computer. That is, the valuation server 200 may be a computer that includes processors such as a CPU or a GPU, main memories such as a RAM or a ROM, and auxiliary memories such as an EPROM, a hard disk drive or a removable medium. The auxiliary memory stores an operating system (OS), various programs, various tables and the like, and a function matching a predetermined object as described below may be implemented by a program stored in the auxiliary memory being loaded in a work area of the main memory and executed and by each structural unit or the like being controlled through execution of the program. However, some or all of the functions may be implemented by a hardware circuit such as an ASIC or an FPGA.

In the present embodiment, the valuation server 200 may be capable of implementing a software server for interacting with the user terminal 100. In this case, input/output of information may be performed by the user terminal 100 accessing a service using a browser or dedicated application software, for example.

The valuation server 200 includes a controller 201, a storage unit 202, and a communication unit 203.

The controller 201 is an arithmetic device in charge of control that is performed by the valuation server 200. The controller 201 may be implemented by an arithmetic processing device such as a CPU.

The controller 201 includes two functional modules, namely, an information collection unit 2011 and a valuation execution unit 2012. Each functional module may be implemented by execution of a stored program by the CPU.

The information collection unit 2011 collects data about a target vehicle by interacting with the user terminal 100. The information collection unit 2011 acquires, from the user terminal 100, two types of data as below.

(1) General Information about Vehicle

For example, information that is generally used at the time of valuation of a vehicle, such as a model, a model year, a chassis number, and a mileage of the vehicle. In the following, these information pieces will be referred to as "basic information".

(2) Image for Determining Presence/Absence of Upgraded Vehicle Part

For example, an image that is obtained by capturing an image of a location where the sticker described above is attached. The information collection unit 2011 determines whether a target vehicle is equipped with an upgraded vehicle part or not, based on such an image. In the following, this image will be referred to as "first image".

Furthermore, in the case where it is determined that the target vehicle is equipped with an upgraded vehicle part, the information collection unit 2011 issues an inquiry to the vehicle management server 300, and acquires the upgrade history. By referring to the upgrade history, the information collection unit 2011 may acquire information about which vehicle part is replaced with (or upgraded to) to which grade. In the following, such information will be referred to as "upgrade information".

The valuation execution unit 2012 performs valuation of the target vehicle based on information collected by the information collection unit 2011.

In the case where the vehicle part is not upgraded, the valuation execution unit 2012 performs valuation of the target vehicle based on the basic information and the valuation standard data. In the case where a vehicle part is upgraded, the valuation execution unit 2012 performs valuation of the target vehicle based on the basic information, the upgrade information, and the valuation standard data.

The storage unit 202 includes a main memory and an auxiliary memory. The main memory is a memory where programs to be executed by the controller 201, and data to be used by the programs are developed. The auxiliary memory is a device where the programs to be executed by the controller 201, and the data to be used by the programs are stored.

Furthermore, the storage unit 202 stores valuation standard data 202A and vehicle data 202B.

The valuation standard data 202A is data recording an evaluation standard for performing valuation of a vehicle (that is, for calculating the valuation price of a used vehicle). For example, as the evaluation standard for performing valuation of a vehicle, there may be cited a vehicle name, a grade, a model year, vehicle inspection/non-inspection, a mileage, state of exterior, state of interior, grade of a mounted vehicle part, and the like. The valuation standard data 202A may be a database, a machine learning model or the like. The valuation standard data 202A is updated as appropriate according to a state of used vehicle market.

The vehicle data 202B is data about a vehicle that is a valuation target (a target vehicle). The vehicle data 202B includes the basic information, the first image, and the upgrade information that are described above.

FIG. 6 is an example of the vehicle data 202B. The vehicle data 202B is updated when the information collection unit 2011 receives the basic information and the first image from the user terminal 100. The vehicle data 202B is also updated when the information collection unit 2011 acquires the upgrade information.

The communication unit 203 is a communication interface for connecting the valuation server 200 to a network. For example, the communication unit 203 includes a network interface board, or a wireless communication interface for wireless communication.

Figure 7:
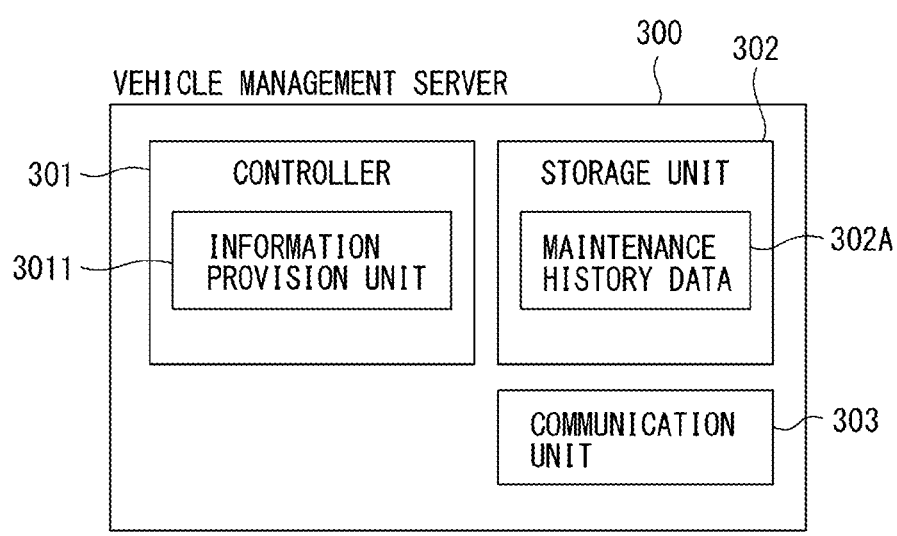
FIG. 7 is a diagram illustrating structural elements of a vehicle management server 300.

Next, a description will be given of the vehicle management server 300. FIG. 7 is a diagram illustrating in detail structural elements of the vehicle management server 300 included in the valuation system according to the present embodiment.

The vehicle management server 300 is a server apparatus that stores, and provides to the valuation server 200, the history information of a plurality of vehicles. The vehicle management server 300 includes a database storing, in relation to a given vehicle, the history information, or in other words, the history of repairs, the history of upgrading of vehicle parts, and the history of replacement of consumables, and is capable of updating and providing the data as necessary.

Like the valuation server 200, the vehicle management server 300 may include a general-purpose computer. That is, the vehicle management server 300 may be a computer that includes processors such as a CPU or a GPU, main memories such as a RAM or a ROM, and auxiliary memories such as an EPROM, a hard disk drive or a removable medium.

The vehicle management server 300 includes a controller 301, a storage unit 302, and a communication unit 303.

The controller 301 is an arithmetic device in charge of control that is performed by the vehicle management server 300. The controller 301 may be implemented by an arithmetic processing device such as a CPU.

The controller 301 includes an information provision unit 3011 as a functional module. This functional module may be implemented by execution of a stored program by the CPU.

The information provision unit 3011 provides the history information in response to a request from the valuation server 200. In the present embodiment, the information provision unit 3011 searches through a database described later based on an identifier of a vehicle received from the valuation server 200, and provides the history information that is obtained to the valuation server 200.

The storage unit 302 includes a main memory and an auxiliary memory. The main memory is a memory where programs to be executed by the controller 301, and data to be used by the programs are developed. The auxiliary memory is a device where the programs to be executed by the controller 301, and the data to be used by the programs are stored.

The storage unit 302 further stores maintenance history data 302A.

The maintenance history data 302A is a database storing a history of maintenance work performed on each of a plurality of vehicles being managed (a maintenance history). The maintenance history data 302A includes the following three types of data.

(1) History about Repairs

A history of repair or replacement of a vehicle part or a vehicle component of a vehicle.

(2) History about Replacement of Consumables

A history of replacement or replenishment of consumables of a vehicle.

(3) Upgrade History of Vehicle Part

A history of upgrading (such as addition, replacement, and software update) of a vehicle part or a vehicle component of a vehicle.

FIG. 8 illustrates an example of the maintenance history data 302A. In the present example, the maintenance history data 302A is a table including the following fields: chassis number, date/time, maintenance type, target, and details.

Data indicating the chassis number of a target vehicle is stored in the chassis number field. Data indicating the date/time when work was performed is stored in the date/time field. Data indicating the type (category) of the maintenance work is stored in the maintenance type field. In the present example, there are three categories of "repair", "replacement of consumables", and "upgrade".

Data for identifying the vehicle part or the vehicle component as a work target is stored in the target field. For example, in the case where replacement or software update is performed in relation to a predetermined electronic control unit (ECU), data for identifying the ECU is stored in the target field. Furthermore, in the case where repair is performed, data for identifying the vehicle part or the vehicle component (such as a door panel) as a repair target is stored in the target field. Furthermore, in the case where consumables are replenished/replaced, data indicating the category of replenished/replaced consumables (such as engine oil) is stored in the target field.

Data about details of maintenance work is stored in the details field. For example, in the case where contents of maintenance work are "upgrade", data indicating which grade of product has been replaced the target vehicle part, what function has been added to the target vehicle part, or the like is stored in the details field. Furthermore, in the case where contents of maintenance work are "repair", data indicating which type of repair work was performed on the target vehicle part (or the vehicle component) is stored in the details field. Moreover, in the case where contents of maintenance work are "replacement of consumables", data indicating which grade of consumables were replenished/replaced with, or the like is stored in the details field.

The communication unit 303 is a communication interface for connecting the vehicle management server 300 to a network. For example, the communication unit 303 includes a network interface board, or a wireless communication interface for wireless communication.

Additionally, the configurations illustrated in FIGS. 4, 5 and 7 are merely examples, and all or some of the illustrated functions may be executed using an exclusively designed circuit. Furthermore, programs may be stored and executed by a combination of main memory and auxiliary memory other than those illustrated.

Next, details of processes that are performed by the apparatuses included in the valuation system will be given.

FIG. 9 is a sequence diagram illustrating processes that are performed by the user terminal 100, the valuation server 200, and the vehicle management server 300.

The processes illustrated in the drawing are started when the user terminal 100 transmits a request (a start request) to start valuation of the vehicle to the valuation server 200.

When the valuation server 200 transmits a response to the user terminal 100, the user terminal 100 performs a step of acquiring the basic information (S11).

In step S11, the user terminal 100 receives input of the basic information. In the present step, the user terminal 100 makes the user input the basic information corresponding to the target vehicle via a predetermined user interface screen. FIG. 10A is an example of the user interface screen that is output. Additionally, the basic information is categorized into one that can be input by referring to the vehicle inspection certificate or the like, and one that needs to be visually evaluated by a person. In the case of the latter, scoring standard may be indicated, and evaluation may be input as a score. FIG. 10B is an example of a screen indicating the scoring standard. Additionally, in the present example, the user is to input the score, but in the case where visual evaluation is necessary, the user may be made to acquire and transmit images (images obtained by capturing images of exterior and interior).

The basic information that is input is transmitted to the valuation server 200 (the information collection unit 2011). The information collection unit 2011 stores the basic information that is received, in the vehicle data 202B.

In step S12, the valuation server 200 (the information collection unit 2011) identifies a part of the target vehicle where the sticker is attached, and generates data for instructing capturing of an image of the part. The attachment part of the sticker may be stored in the storage unit 202 in advance. Additionally, in the case where the attachment part of the sticker is different for each vehicle, the information collection unit 2011 may identify a vehicle model of the target vehicle based on the basic information, and may identify the attachment part based on the vehicle model. The data for instructing capturing may include a drawing or text, for example.

Figure 11:
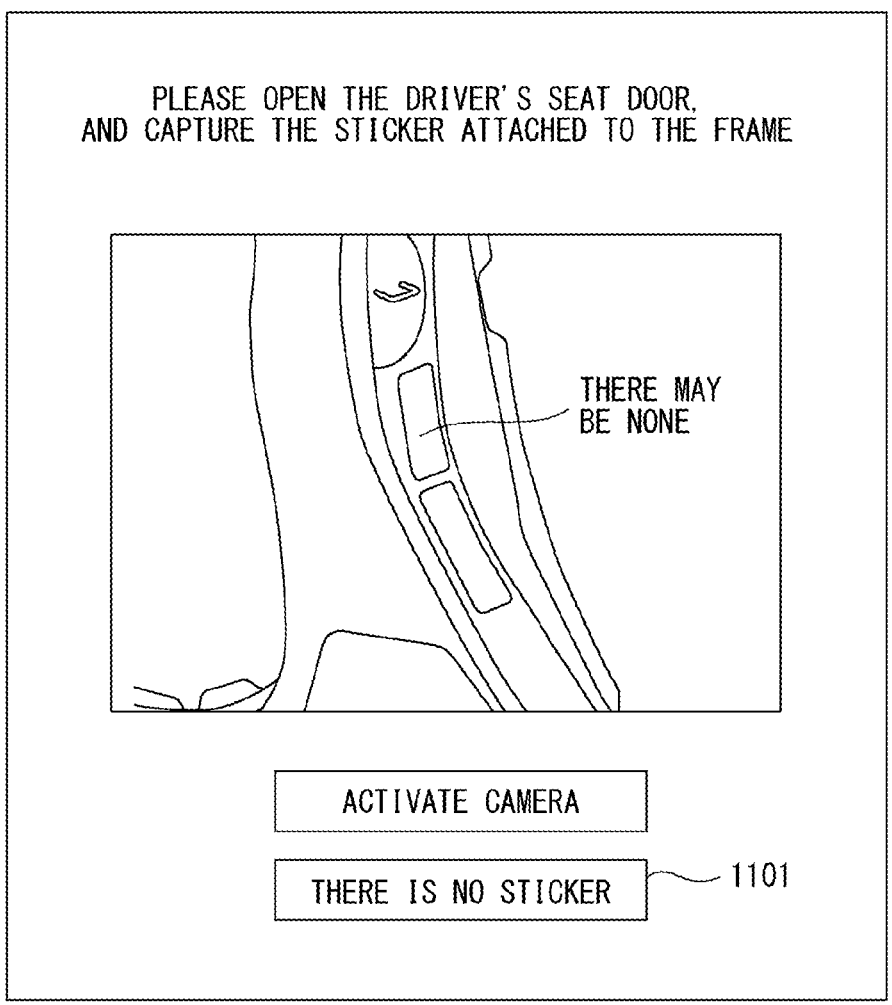
FIG. 11 is an example of a screen for notifying of an attachment location of the sticker.

The data for instructing capturing is transmitted to the user terminal 100, and is output via a screen. FIG. 11 is an example of the screen instructing capturing.

In step S13, the user terminal 100 acquires an image corresponding to the instructed part via the camera 105, and transmits the obtained image to the valuation server 200 as the first image. Additionally, in the case where a vehicle to which the sticker is not attached is the valuation target, the sticker may not be included in the first image.

The information collection unit 2011 stores the first image that is received, in the vehicle data 202B.

In step S14, the information collection unit 2011 detects whether the sticker is included in the first image or not. Detection of the sticker may be performed by a known technique such as pattern matching.

In the case where the sticker is not detected from the first image (step S15: No), it is determined that the target vehicle is not upgraded. In this case, the process proceeds to step S17. In the case where the sticker is detected from the first image (step S15: Yes), it is determined that the target vehicle is upgraded. In this case, the process proceeds to step S16.

In step S16, the valuation server 200 issues an inquiry to the vehicle management server 300, and acquires the upgrade history of the target vehicle. In the present step, the valuation server 200 issues a request to search through the maintenance history data 302A with an identifier (such as the chassis number) of the target vehicle as a key, and the vehicle management server 300 searches through the maintenance history data 302A in response. Additionally, search is performed taking only records with the maintenance type "upgrade" as targets. A record that is obtained as a result of the search is transmitted to the valuation server 200. The valuation server 200 (the information collection unit 2011) generates the upgrade information based on the information mentioned above, and stores the upgrade information in the vehicle data 202B. The upgrade information includes information for identifying the vehicle part that is upgraded, information about grade, function, quality, and performance of the vehicle part, and the like.

In step S17, the valuation execution unit 2012 calculates the valuation price of the target vehicle based on the data stored in the vehicle data 202B, or in other words, the basic information or both the basic information and the upgrade information. For example, the valuation price of the vehicle may be determined by determining a basic valuation price of the vehicle and subtracting, from the basic valuation price, an amount of money corresponding to deduction elements (such as mileage, scratches on exterior, stains on interior, parts needing repair, and the like). The basic valuation price and the amount of money to be deducted may be defined in the valuation standard data 202A.

Furthermore, in the case where the target vehicle includes an upgraded vehicle part, an amount of money corresponding to the vehicle part may be added. The amount of money to be added may be defined in the valuation standard data 202A in association with type, grade, function, quality, performance and the like of the target vehicle part.

Moreover, in the case where the valuation standard data 202A is a machine learning model, the basic information and the upgrade information may be given to the machine learning model as input data, and the valuation price that is output may be acquired.

The valuation price that is calculated is transmitted to the user terminal 100, and is presented to the user.

As described above, in the first embodiment, a user requesting online valuation of a vehicle captures an image of a sticker that is attached to the target vehicle using the user terminal 100, and transmits the image to the valuation server 200. Furthermore, the valuation server 200 determines whether the target vehicle is upgraded or not, using the image. According to such a configuration, the user may trigger the valuation server 200 to acquire the upgrade information, without any knowledge about vehicle parts.

Additionally, in the present embodiment, whether the sticker is attached or not is determined by the valuation server 200 based on the first image, but whether the sticker is attached or not may be input by the user.

For example, the user may report whether the sticker is attached or not, by pressing a button as indicated by reference character 1101 in FIG. 11. In this case, instead of the first image, the user terminal 100 may transmit data indicating whether the sticker is attached or not, to the valuation server 200.

Second Embodiment

In the first embodiment, the valuation server 200 acquires the upgrade information by issuing an inquiry to the vehicle management server 300. In contrast, a second embodiment is an embodiment in which the valuation server 200 instructs the user to collect the upgrade information.

Additionally, a valuation system according to the second embodiment does not include the vehicle management server 300 described in the first embodiment.

As described above, the sticker that is attached to a vehicle body displays that any of a plurality of vehicle parts is upgraded.

Detailed information about upgrading of a vehicle part is sometimes recorded in a maintenance note (a maintenance record) or the like of the vehicle. For example, it is conceivable that, every time a vehicle part is upgraded, a certificate that describes contents of the upgrade (hereinafter "upgrade certificate") is issued and attached to a maintenance note or the like. FIG. 12 is an example of the maintenance note where the upgrade certificate is attached. As illustrated, one upgrade certificate is issued for each vehicle part.

In the second embodiment, in the case where the sticker is detected from the first image, the valuation server 200 instructs the user to capture an image of the upgrade certificate. For example, the valuation server 200 instructs the user to open a predetermined page of the maintenance note and capture an image of the upgrade certificate. An image obtained by capturing an image of the upgrade certificate will be referred to as a second image.

Furthermore, the valuation server 200 generates the upgrade information based on the upgrade certificate detected from the second image that is obtained.

Figure 13:
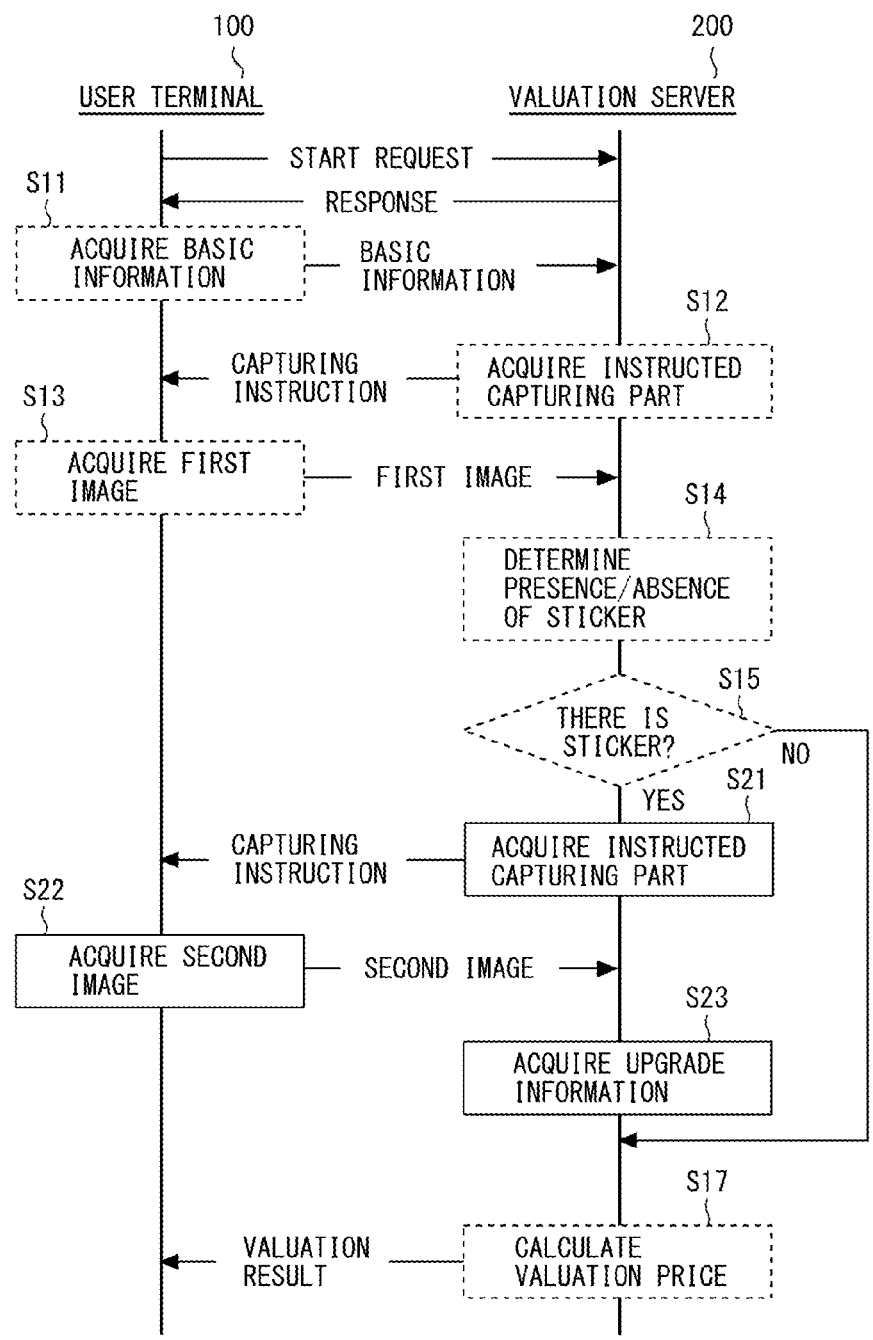
FIG. 13 is a sequence diagram illustrating processes that are performed by the structural elements in a second embodiment.

FIG. 13 is a sequence diagram illustrating processes that are performed by the user terminal 100 and the valuation server 200 in the second embodiment. Processes in steps S11 to S15 are the same as those in the first embodiment, and detailed description thereof will be omitted. Here, a process in the case where a positive determination is made in step S15 (the case where the sticker is determined to be included in the first image) will be described.

First, in step S21, the information collection unit 2011 identifies the part where the upgrade certificate is attached, and generates data for instructing capturing of the part. The attachment part of the upgrade certificate may be a predetermined page of the maintenance note (the maintenance record) of the vehicle, for example. Data about the attachment part of the upgrade certificate (for example, page number) may be stored in the storage unit 202. Additionally, in the case where the attachment part of the upgrade certificate is different for each vehicle, the information collection unit 2011 may identify the vehicle model based on the basic information, and identify the attachment part based on the vehicle model.

Figure 14:
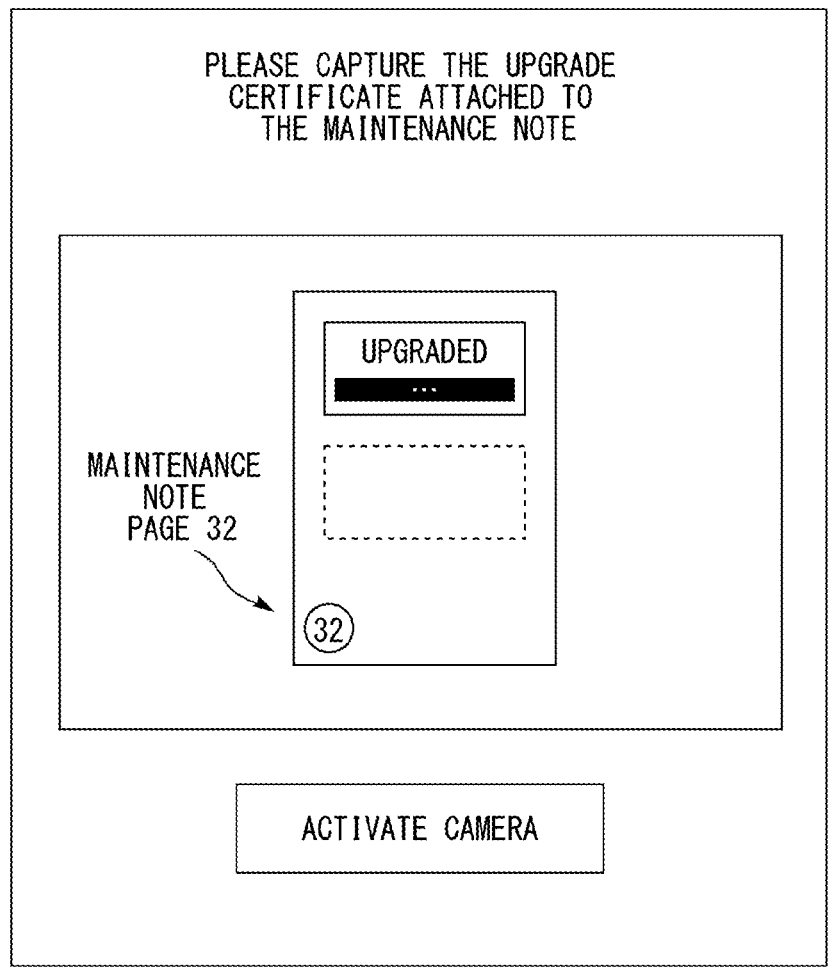
FIG. 14 is an example of a screen for notifying of an attachment location of the upgrade certificate.

The data for instructing capturing is transmitted to the user terminal 100, and is output via the screen. FIG. 14 is an example of the screen instructing capturing.

In step S22, the user terminal 100 acquires an image corresponding to the instructed part via the camera 105, and transmits the obtained image to the valuation server 200 as the second image. The information collection unit 2011 stores the second image that is received, in the vehicle data 202B.

Additionally, in the present example, an example is cited where a plurality of upgrade certificates are attached on a identified page of the maintenance note, but the upgrade certificates may be attached separately on a plurality of pages. Furthermore, the upgrade certificates do not have to be attached.

In this case, the user terminal 100 may transmit, to the valuation server 200, a plurality of images that are obtained by capturing images of the plurality of upgrade certificates, respectively, as the second images.

In step S23, the information collection unit 2011 detects one or more upgrade certificates from the second image, and identifies the vehicle part corresponding to each certificate and details thereof (such as grade, function, quality, performance and the like). The vehicle part and the details may be identified by recognizing letters written on the upgrade certificate, for example. Additionally, a code for identifying the vehicle part and the details may be printed on the upgrade certificate. For example, character strings indicating the vehicle part that is upgraded and information about the details may be two-dimensionally coded and printed on the upgrade certificate. In this case, the information collection unit 2011 may identify the vehicle part corresponding to the upgrade certificate and the details by decoding the two-dimensional code.

The information collection unit 2011 generates the upgrade information based on the vehicle part and the details that are identified, and causes the upgrade information to be stored in the vehicle data 202B.

The process performed in step S17 is the same as in the first embodiment.

As described above, in the second embodiment, in the case where a sticker that is attached to the vehicle body is detected, the valuation server 200 generates an instruction for making the user capture an image of the upgrade certificate, and acquires the second image including the upgrade certificate. According to such a mode, the user may provide information about the upgrade to the valuation server 200 simply by performing capturing an image according to the instruction.

Third Embodiment

In the second embodiment, instructions to acquire the first image and the second image are issued by the valuation server 200, but the instruction to acquire each image may be issued by the user terminal 100 itself. A third embodiment is an embodiment in which the user terminal 100 itself outputs the instruction to capture an image of the sticker and the instruction to capture an image of the upgrade certificate.

Figure 15:
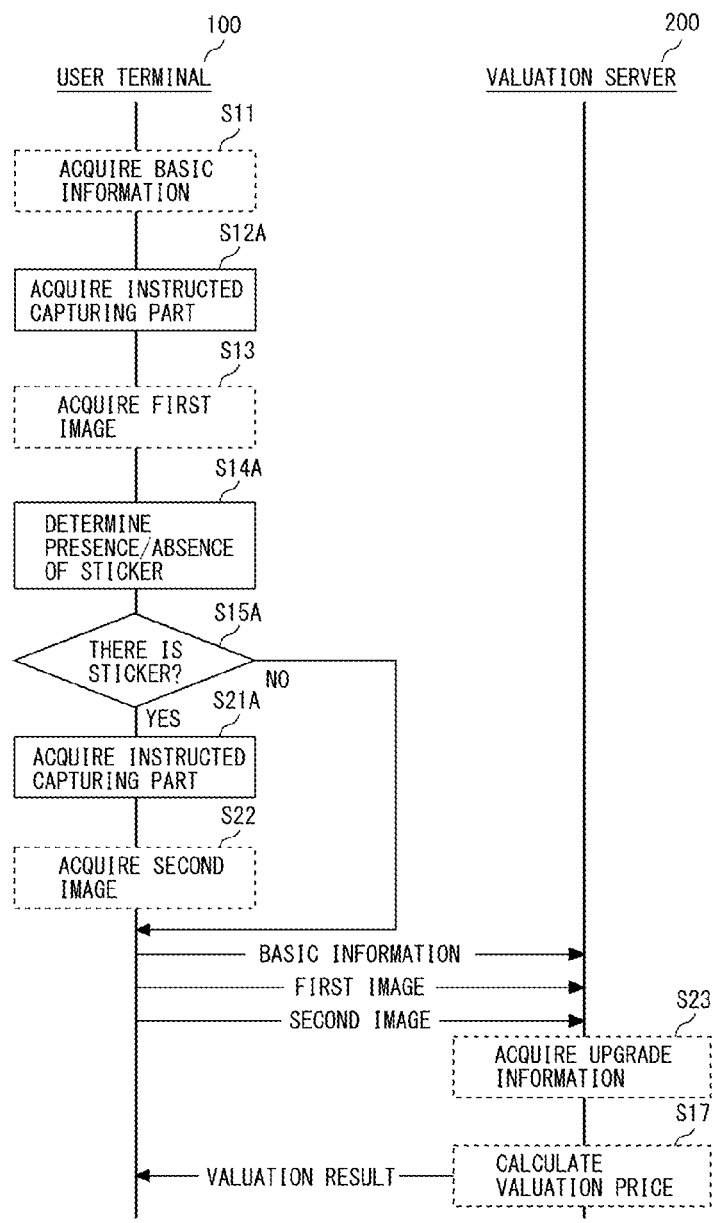
FIG. 15 is a sequence diagram illustrating processes that are performed by the structural elements in a third embodiment.

FIG. 15 is a sequence diagram illustrating processes that are performed by the user terminal 100 and the valuation server 200 in the third embodiment.

In the present embodiment, instead of the valuation server 200 performing the processes in steps S12, S14, S15, and S21, the user terminal 100 performs similar processes (steps S12A, S14A, S15A, S21A). That is, the user terminal 100 outputs, by itself, a notice regarding capturing an image. In the third embodiment, the user terminal 100 may hold, for each vehicle model, data about an attachment location of the sticker or an attachment location of the upgrade certificate. Furthermore, the user terminal 100 may hold data for performing image recognition on the sticker or the upgrade certificate.

The basic information, the first image, and the second image that are acquired by the user terminal 100 are collectively transmitted to the valuation server 200 after a process in step S22 is completed. Processes from step S23 are the same as those in the second embodiment. Additionally, transmission of the first image may be omitted.

As described above, the user terminal 100 may perform, by itself, the process for instructing the user to acquire the first image, the process for detecting the sticker from the first image, and the process for instructing the user to acquire the second image.

Modifications

The embodiments described above are merely examples, and the present disclosure may be changed as appropriate within the scope of the disclosure.

For example, the processes and means described in the present disclosure may be freely combined and practiced to the extent that no technical conflict exists.

In the description of the embodiments, there is one type of sticker that is attached to the vehicle, but in the case where there are a plurality of vehicle parts related to upgrade, a plurality of stickers corresponding to respective vehicle parts may be attached to the vehicle. Name of the corresponding vehicle part and contents of upgrade (such as quality or function) may be described on each sticker. In this case, the valuation server 200 may acquire the upgrade information by performing a process as described in relation to step S23 on the first image. That is, the processes in steps S14 to S22 in FIG. 13 may be omitted.

Furthermore, in the description of the embodiments, the valuation server 200 automatically performs valuation of a vehicle based on collected information, but valuation of a vehicle may also be performed manually. For example, after the valuation server 200 roughly calculates a valuation price based on collected information, related information may be transmitted to outside to make a person in charge of valuation perform more detailed valuation. Furthermore, the valuation server 200 may simply function as an apparatus that collects data for performing valuation and that transmits the data to outside.

Data to be transmitted to outside may include the basic information, the first image, the second image, the upgrade information, and the like.

Furthermore, a process that is described to be performed by one apparatus may be shared and performed by a plurality of apparatuses. Alternatively, processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium includes any type of disk including magnetic disks (floppy (registered trademark) disks, hard disk drives (HDDs), etc.) and optical disks (CD-ROMs, DVD discs, Blu-ray discs, etc.), read-only memories (ROMs), random access memories (RAMs), EPROMS, EEPROMs, magnetic cards, flash memories, optical cards, and any type of medium suitable for storing electronic instructions, for example.

What is claimed is:

1. An information processing apparatus comprising a controller configured to:
receive basic information of a first vehicle, the basic information being input via a touch panel display of a user terminal, being transmitted from the user terminal, and including at least a vehicle name of the first vehicle, a grade of the first vehicle, a model year of the first vehicle and a vehicle body color of the first vehicle;

transmit to the user terminal, data notifying of a predetermined location where a sticker is attached to make the touch panel display of the user terminal display the data notifying of the predetermined location, the sticker displaying that an upgraded vehicle part is mounted, the upgraded vehicle part being a vehicle part with a higher function or a higher quality than a vehicle part installed at a time of sale of a new vehicle, or a vehicle part not installed at the time of sale of the new vehicle but added in an ex-post manner to enhance function or quality of the new vehicle;

receive a first image captured by a camera of the user terminal and transmitted from the user terminal, the first image including the predetermined location of the first vehicle;

determine whether the sticker is attached to the first vehicle or not based on the first image;

acquire upgrade information of the first vehicle, the upgrade information including information identifying a type of the upgraded vehicle part being installed in the first vehicle and information about function or quality of the upgraded vehicle part being installed in the first vehicle, in a case where the sticker is attached to the first vehicle;

calculate a basic valuation price of the first vehicle based on the basic information of the first vehicle;

calculate an amount of money corresponding to the upgraded vehicle part being installed in the first vehicle based on the upgrade information of the first vehicle;

add the amount of money to the basic valuation price to acquire a valuation price of the first vehicle; and transmit the valuation price of the first vehicle to the user terminal to make the touch panel display of the user terminal display the valuation price of the first vehicle.

2. The information processing apparatus according to claim 1, wherein the controller is further configured to detect the sticker from the first image transmitted from the user terminal.

3. The information processing apparatus according to claim 2, wherein, in a case where the sticker is attached to the first vehicle, the controller is further configured to identify the upgraded vehicle part being installed in the first vehicle.

4. The information processing apparatus according to claim 3, wherein the controller is further configured to identify the upgraded vehicle part being installed in the first vehicle and generate the upgrade information of the first vehicle based on a description on the sticker included in the first image.

5. The information processing apparatus according to claim 3, wherein the basic information further includes a chassis number of the first vehicle, and in a case where the sticker is attached to the first vehicle, the controller is further configured to:
  transmit an inquiry to a server apparatus storing an upgrade history of a vehicle, the inquiry including the chassis number of the first vehicle;
  receive the upgrade history of the first vehicle, the upgrade history being transmitted from the server apparatus and corresponding to the chassis number of the first vehicle; and
  identify the upgraded vehicle part being installed in the first vehicle and generate the upgrade information of the first vehicle based on the upgrade history of the first vehicle.

6. The information processing apparatus according to claim 3, wherein, in a case where the sticker is attached to the first vehicle, the controller is further configured to:
  transmit data requesting transmission of a second image to the user terminal;
  receive the second image captured by the camera of the user terminal and transmitted from the user terminal; and
  identify the upgraded vehicle part being installed in the first vehicle and generate the upgrade information of the first vehicle based on the second image.

7. The information processing apparatus according to claim 6, wherein the second image is an image that is obtained by capturing an image of a certificate about the upgraded vehicle part.

8. An information processing method comprising:
  receiving basic information of a first vehicle, the basic information being input via a touch panel display of a user terminal, being transmitted from the user terminal, and including at least a vehicle name of the first vehicle, a grade of the first vehicle, a model year of the first vehicle and a vehicle body color of the first vehicle;
  transmitting to the user terminal, data notifying of a predetermined location where a sticker is attached to make the touch panel display of the user terminal display the data notifying of the predetermined location, the sticker displaying that an upgraded vehicle part is mounted, the upgraded vehicle part being a vehicle part with a higher function or a higher quality than a vehicle part installed at a time of sale of a new vehicle, or a vehicle part not installed at the time of sale of the new vehicle but installed in an ex-post manner to enhance function or quality of the new vehicle;
  receiving a first image captured by a camera of the user terminal and transmitted from the user terminal, the first image including the predetermined location of the first vehicle;
  determining whether the sticker is attached to the first vehicle or not based on the first image;
  acquiring upgrade information of the first vehicle, the upgrade information including information identifying a type of the upgraded vehicle part being installed in the first vehicle and information about function or quality of the upgraded vehicle part being installed in the first vehicle, in a case where the sticker is attached to the first vehicle;
  calculating a basic valuation price of the first vehicle based on the basic information of the first vehicle;
  calculating an amount of money corresponding to the upgraded vehicle part being installed in the first vehicle based on the upgrade information of the first vehicle;
  adding the amount of money to the basic valuation price to acquire a valuation price of the first vehicle; and
  transmitting the valuation price of the first vehicle to the user terminal to make the touch panel display of the user terminal display the valuation price of the first vehicle.

9. The information processing method according to claim 8, further comprising:
  detecting the sticker from the first image transmitted from the user terminal.

10. The information processing method according to claim 9, wherein, in a case where the sticker is attached to the first vehicle, the upgraded vehicle part being installed in the first vehicle is identified.

11. The information processing method according to claim 10, further comprising:
   identifying the upgraded vehicle part being installed in the first vehicle and generating the upgrade information of the first vehicle based on a description on the sticker included in the first image.

12. The information processing method according to claim 10, wherein the basic information further includes a chassis number of the first vehicle, and the information processing method further comprises, in a case where the sticker is attached to the first vehicle:
   transmitting an inquiry to a server apparatus storing an upgrade history of a vehicle, the inquiry including the chassis number of the first vehicle;
   receiving the upgrade history of the first vehicle, the upgrade history being transmitted from the server apparatus and corresponding to the chassis number of the first vehicle; and
   identifying the upgraded vehicle part being installed in the first vehicle and generating the upgrade information of the first vehicle based on the upgrade history of the first vehicle.

13. The information processing method according to claim 10, further comprising, in a case where the sticker is attached to the first vehicle:
   transmitting data requesting transmission of a second image;
   receiving the second image captured by the camera of the user terminal and transmitted from the user terminal; and
   identifying the upgraded vehicle part being installed in the first vehicle and generating the upgrade information of the first vehicle based on the second image.

14. The information processing method according to claim 13, wherein the second image is an image that is obtained by capturing an image of a certificate about the upgraded vehicle part.

15. A non-transitory storage medium storing a program for causing a computer to perform the information processing method according to claim 8.

* * * * *